Dec. 24, 1957 S. PANTAGES ET AL 2,817,706

AUTOPHONE

Filed June 18, 1953 2 Sheets-Sheet 1

INVENTORS:
STEVEN N. PANTAGES AND
EMMANUEL N. PANTAZIS
BY
[signature]

AUTOPHONE

Filed June 18, 1953 2 Sheets-Sheet 2

INVENTORS:
STEVEN N. PANTAGES AND
EMMANUEL N. PANTAZIS
BY

[signature]

2,817,706

AUTOPHONE

Steven Pantages and Emmanuel N. Pantazis, New York, N. Y.

Application June 18, 1953, Serial No. 363,984
10 Claims. (Cl. 179—1)

This invention relates to an autophone. More particularly the present invention relates to a reading apparatus to be used by blind persons. However the present invention can be used for other purposes as well, such as communication and automatic telephone answering systems.

It is an object of the present invention to provide a reading apparatus which operates according to a novel principle.

It is another object of the present invention to provide a reading apparatus which allows coherent passages to be read phonetically.

It is a further object of the present invention to provide a reading apparatus which is inexpensive and sturdy.

It is still another object of the present invention to provide a reading apparatus which allows the reading matter to be read either quickly or rather slowly so that the words of the reading matter are phonetically spelled.

A reading apparatus according to the present invention comprises in its broadest aspects a stationary plate having an electroconductive face, a stationary probe arranged opposite to the face of the plate at a predetermined distance from the face so as to define therewith a gap, means for moving an insulating tape in this gap, the insulating tape having a plurality of perforations, a plurality of movable contacts arranged in the probe, the contacts having, respectively, end portions adapted to make contact with the face of the plate through the perforations of the tape during the motion thereof, an electric circuit including a current source, the face of the plate and the contacts of the probe, a plurality of electric light sources inserted in the electric circuit and associated, respectively, with the contacts so as to be energized when the end portions thereof make contact with the face of the plate, a rotatable part enclosing the light sources and having sound tracts associated, respectively, with the light sources, means for rotating the part so as to carry the sound tracks, respectively, round the light sources, photoelectric means arranged for cooperation with the sound tracks so as to be excited by the light beams emitted, respectively, by the light sources and traversing the sound tracks, and a sound-producing device connected to the photoelectric means, the device producing sounds corresponding, respectively, to the perforations of the tape when the latter is moved in the gap defined by the plate and the probe.

Preferably the rotatable part is formed by a drum being permeable for light and the photoelectric means is formed by a photoelectric cell to which the light emitted by the electric light sources is directed by tubes associated, respectively, with the electric light sources.

In one embodiment of the present invention the rotatable part is driven by an electric motor connected in a first electric circuit including a current source, the face of the plate and part of the contacts of the probe.

The electric motor comprises preferably a shaft to which a first gear wheel is rigidly connected so as to participate in the rotation thereof, a second gear wheel rigidly connected to an extension rigidly connected to one of the end faces of the rotatable drum and being in engagement with the first gear wheel, a spring contact connected in parallel to the contacts forming part of the first electric circuit and being kept open by means rigidly attached to the extension in a predetermined position thereof so that the electric motor is kept rotating by the spring contact when the end portions of the contacts forming part of the first electric circuit are partly kept out of contact with the face of the plate by the insulating tape, the electric motor being stopped when the spring contact is opened in the predetermined position.

Another embodiment of the present invention comprises, in combination, a stationary plate having an electroconductive face, a plurality of stationary probes arranged opposite to the face of the plate at a predetermined distance from the face so as to define therewith a gap, means for moving an insulating tape in the gap, the insulating tape having a plurality of perforations, a plurality of sets of movable contacts arranged, respectively, in the probes, the contacts having, respectively, end portions adapted to make contact with the face of the plate through the perforations of the tape during the motion thereof, each of the sets including a first contact, a second contact, and additional contacts, the second contacts being multiplied with each other, the additional contacts including corresponding contacts multiplied with one another, a plurality of current sources connected, respectively, to the first contacts, an electric motor having a first terminal and a second terminal, said second terminal being connected with the second contacts multiplied with one another, a multiple switch having a first contact piece and a plurality of second contact pieces cooperating with the first contact piece, one at a time, the first contact piece of the multiple switch being connected to the first terminal of the electric motor, the second contact pieces of the multiple switch being connected, respectively, with the current sources, means for imparting to the first contact piece of the multiple switch a motion relative to the second contact pieces of the multiple switch, the motion imparting means being connected to the electric motor so as to impart a relative motion of the first contact piece and the second contact pieces of the multiple switch in dependence on the rotation of the electric motor, a plurality of electric light sources associated, respectively, with the additional contacts multiplied with one another, a rotatable part enclosing the light sources and having sound tracks associated, respectively, with the light sources, means for rotating the part so as to carry the sound tracks, respectively, round the light sources, photoelectric means arranged for cooperation with the sound tracks so as to be excited by the light beams emitted, respectively, by the light sources and traversing the sound tracks, and a sound-producing device connected to the photoelectric means whereby the light sources are energized in a sequence determined by the perforations of the tape and the motion of the multiple contact switch.

Preferably, an electroconductive rod is arranged on the shaft of the multiple switch so as to be radially displaceable with respect to the shaft and the first contact piece is movably attached to one end of the electroconductive rod.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagrammatic view partly in section of a first embodiment of my invention;

Fig. 1*a* is a plan view of a part of the embodiment shown in Fig. 1;

Figures 1, 1A, 5:
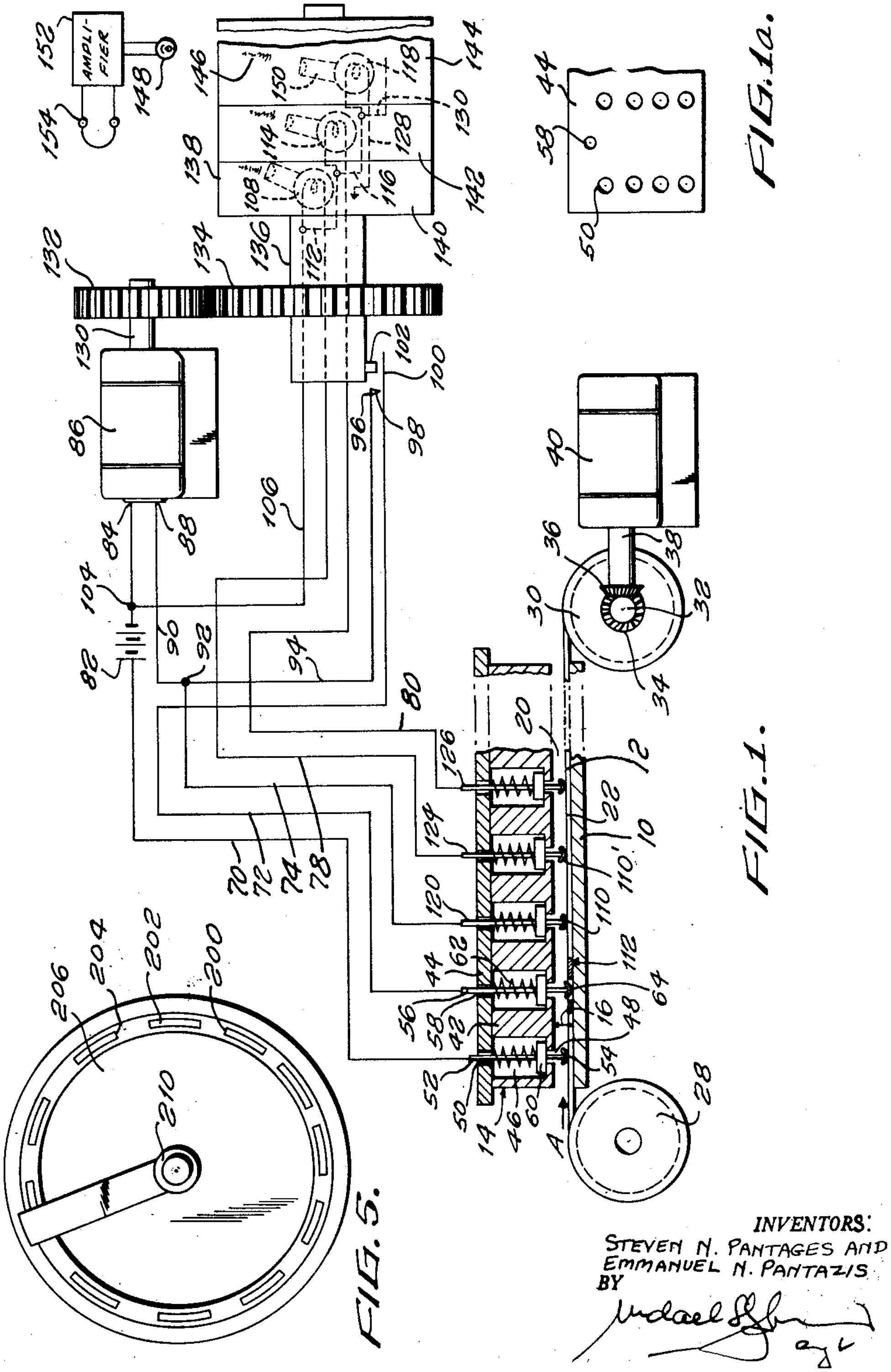
Fig. 5 illustrates the multiple contact switch used in the arrangement of Fig. 3.
Figures 2, 3, 4:
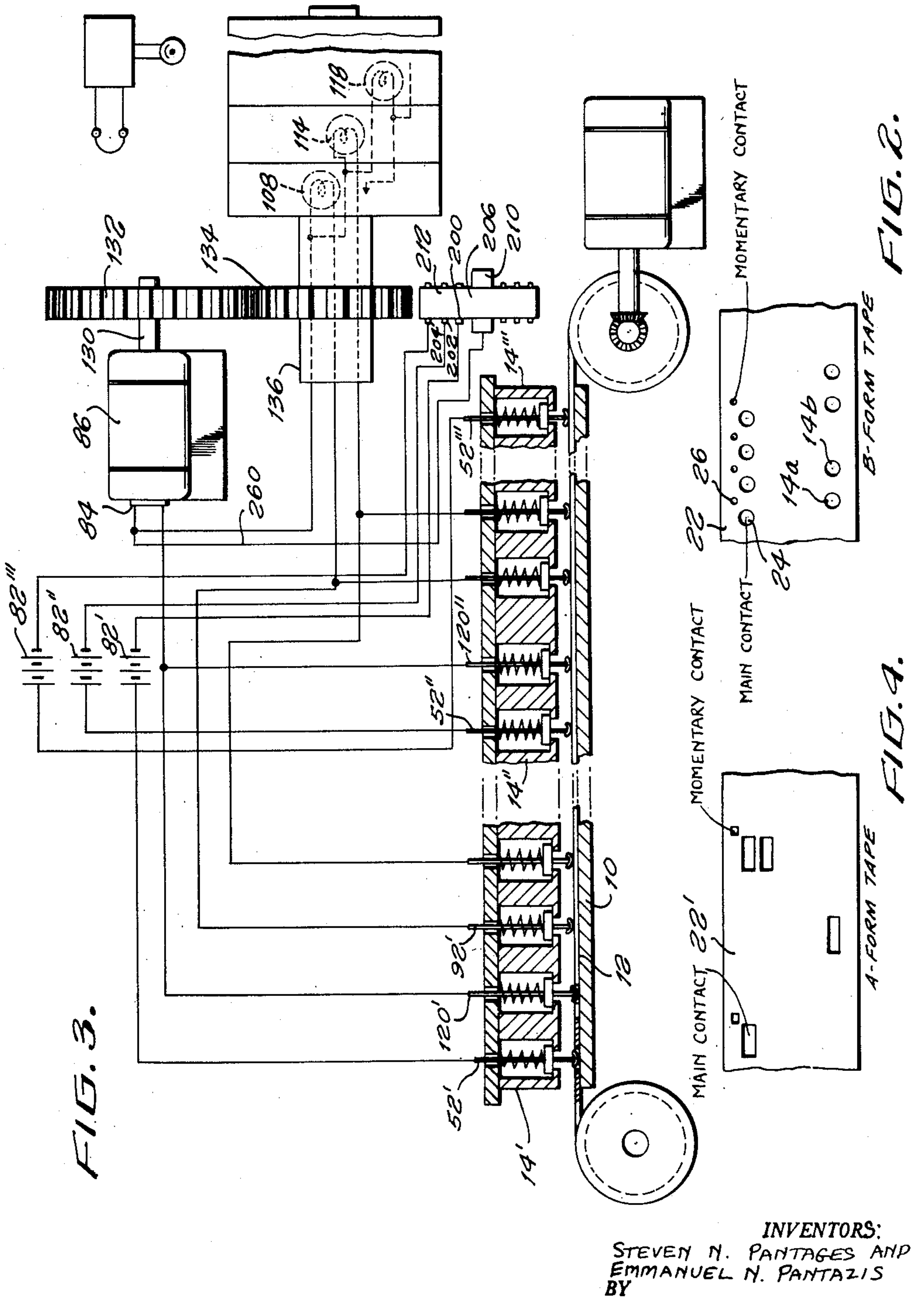
Fig. 2 is a plan view of a portion of the tape used with the embodiment shown in Fig. 1.
Fig. 3 is a showing similar to Fig. 1 of a second embodiment according to the present invention.
Fig. 4 is a plan view of part of the tape to be used with the embodiment shown in Fig. 3.

Referring now to the drawings and first to Figs. 1 and 2 a stationary plate 10 is provided with an electroconductive face 12. It should be understood, however, that the plate 10 can be made of metal or the like so that it is entirely electro-conductive and not only the face 12 thereof. A stationary probe 14 is arranged opposite to the face 12 of the plate 10 at a predetermined distance 16 from the face 12 so as to define therewith a gap 20. The probe 14 may consist of any material, preferably of insulating material. In the gap 20, and in contact with face 12 of the plate 10 is arranged an insulating tape 22 (see also Fig. 2), having a plurality of perforations 24 and 26 the purpose of which will become apparent hereinafter. The tape 22 is moved along the gap 20 from a reel 28 in the direction of the arrow A to a reel 30 to which the forward end of the tape 22 is connected. The reel 30 is provided with a shaft 32 carrying a bevel gear 34 meshing with a bevel gear 36 rigidly connected to the shaft 38 of an electric motor 40. It will be understood that the electric motor drives the reel 30 through the gearing 32—38 so that the tape 22 is moved along the gap 20 in contact with the electro-conductive face 12 of the stationary plate 10.

The probe 14 comprises a body 42 and a lid 44. The body 42 has a series of cavities such as 46 having at their lower ends apertures such as 48 corresponding to apertures 50 of the lid 44. The cavities 46 and the apertures 48 and 50 form a rectangular array as more fully shown in Fig. 1*a* showing a plan view of the lid 44. Inside each cavity is arranged a movable contact such as 52, 120, 124, 126, etc. having an end portion such as 54 being adapted to make contact with the face 12 of the plate 10 through the perforations such as 24 of the tape 22 during the motion thereof. The end portions such as 54 are shaped as curved, e. g. part-spherical surfaces so that they can enter the perforations but are lifted whenever the tape 22 moves on without tearing the same.

Furthermore, the probe 14 has a special contact 56 passing through an aperture 58 of the lid 44 and having an end portion 64 making permanent contact with the face 12 of the plate 10 for a reason more fully to be explained hereinafter. The aperture 58 is positioned outside the rectangular array formed by the apertures 50. The contact 120 has an end portion extending through the performation 26 of the tape 22.

Each of the contacts such as 52 is rigidly connected to a plate 60 cooperating with the lower end face of the respective cavity 46 and a compression spring 62 surrounds the stem portion of the contact such as 52 and abuts against the lid 44 and the plate 60. The purpose of the spring 62 is to press the plate 60 downwards so that the pointed end 54 penetrates the perforations such as 24 or 26 of the tape 22 when the latter moves in the direction of the arrow A.

The mobile contacts such as 52, 56, 120, 124, 126, etc. are connected, respectively, to electrical conductors 70, 72, 74, 78, 80 etc. The electrical conductor 70 includes the battery 82 and is connected to one terminal 84 of an electric motor 86, the other terminal 88 of which is connected by a conductor 90 to the junction 92 to which are connected the conductor 74 and a conductor 94 leading to a contact 96 of a spring contact 98, the other resilient contact member 100 of which is connected to the conductor 72 connected to the mobile contact 56 extending through the aperture 58 of the lid 44 and the end portion 64 of which cooperates with the perforation 26 of the insulating tape 22. The spring contact 98 is actuated by a cam 102 as more fully described hereinafter.

The junction 104 of the battery 82 and the terminal 84 of the electric motor 86 is connected by a conductor 106 to one terminal of a first electric light source such as an electric lamp 108 the other terminal of which is connected to the conductor 78 so that the lamp 108 is energized whenever the end portion 54 of the mobile contact 52 connected over conductor 70 to battery 82 and the end portion 110′ of the mobile contact 124 connected to conductor 78 extend through the perforations such as 24 of the insulating tape 22 so that they make contact with the electroconductive face 12 of the plate 10. A conductor 112 branches off from the conductor 106 and is connected to the second electrical light source 114 connected to the conductor 80 connected with the mobile contact 126. A conductor 116 is branched off from the conductor 112 and connected to a third electric light source 118 connected by a conductor 128 to a mobile contact (not shown) of the probe 14. A conductor 130 branches off from the conductor 116 and leads in a similar manner to a fourth electric light source (not shown). Thus it will be understood that each light source or lamp is energized whenever the end portion 54 of the mobile contact 52 and the end portion of one of the mobile contacts 120, 124, 126 etc. extend through perforations of the tape 22 so as to make contact with the electro-conductive face 12 of the plate 10. The lamp circuits which have just been described are referred to hereinafter as the second electric circuit.

On the other hand the conductor 72 connected to the mobile contact 56, the contact spring 98 connected thereto, and the conductors 94 and 90 form together with the conductor 70 connected to the mobile contact 52 a first electric circuit including the battery 82 and the electric motor 86. The latter is energized whenever the end portion 54 makes contact with the electroconductive face 12 of the plate 10 and either the spring contact 98 is closed or the end portion 110 of the mobile contact 120 makes contact with the electroconductive face 12 of the plate 10, the end portion 64 of the mobile contact 56 being permanently in contact with the electroconductive face 12 of the plate 10.

The electric motor 86 has a shaft 130 rigidly connected to a first gear wheel 132 which participates in the rotation thereof and meshes with a second gear wheel 134 rigidly connected to a hollow extension 136 of a rotatable part such as a drum 138 being permeable for light. The drum encloses the light sources, such as the lamps 108, 114 and 118, and the conductors, such as 78, 80, 106 extend through the extension 136 of the drum 138. The drum 138 is rotated by the motor 86 through the gear wheels 132 and 134 meshing with each other. The cam 102 opening the spring contact 98 is rigidly connected to the extension 136 and opens the spring contact is a predetermined angular position of the drum 138 and extension 136 so that the spring contact 98 is closed in any different angular position thereof. When the spring contact 98 is closed it establishes a connection between the conductor 72 and the conductor 90 and the conductor 74 connected to the mobile contact 120 is rendered inoperative, the motor 86 being energized by the mobile contacts 52 and 56.

The drum 138 is subdivided into sections 140, 142, 144, etc. corresponding, respectively, to the lamps 108, 114, 118 etc. and carrying sound tracks such as 146. A photoelectric cell 148 is arranged at the center of the circle passing through the centers of the lamps 108, 114 and 118, etc., the light of which is directed by hollow tubes such as 150 to the photoelectric cell 148. In the drawing the distance of the photoelectric cell from the drum 138 is shown on a reduced scale and it is to be understood that the photoelectric cell should be arranged at the center of the circle just mentioned. The sound tracks such as 146 are so arranged on the curved surface of the drum 138 that they are in the path of the light rays from the lamps 108, 114, 118, respectively, to the photoelectric cell 148. The output of the photoelectric cell 148 is connected with an amplifier 152 the output of which is connected to a sound producing device 154 shown as a pair of earphones. However, it should be understood that any other sound producing device such as a telephone receiver or a loud speaker could be substituted for the earphones 154. Instead of using a sound track in conjunction with a photoelectric cell other types of recording apparatus could be used, such as magnetic wire or tape recorders, in conjunction with associated sound reproducing devices.

The operation of the device is as follows:

The tape 22 shown in Fig. 2 is provided with a plurality of circular perforations such as 24, 14*a*, 14*b* and the perforations 26 which are shaped as relatively small circles. A letter or phonetic sound is represented by two perforations such as 24 and 14*a* and one small perforation 26. The relative distance between contact 24, which may be considered as a main contact and another contact such as 14*a*, 14*b* . . . determines the letter or phonetic sound. In consequence thereof the apparatus can be used for reading by blind persons, the text to be read being translated into perforations on the tape 22.

The tape 22 is inserted into the gap 20 as shown in Fig. 1 and moves along the gap in the direction of the arrow A shown in Fig. 1 so that the end portions such as 54, of the mobile contacts 52, 124, 126, etc. come into contact with the electroconductive face 12 of the plate 10 whenever the perforations such as 24 and 114 pass underneath the same. In consequence thereof the lamps such as 108, 114, 118 etc. are energized and the light penetrates through the corresponding sound track such as 146 to the photoelectric cell 148 which actuates over the amplifier 152 the sound reproducing device 154 so that sounds corresponding to the perforations of the tape 22 become audible.

At the first instance of the operation of the device shown in Fig. 1 the spring contact 98 is kept open by the cam 102. However, the motor is energized over the mobile contact 120 the end portion 110 of which penetrates through the perforation 26 of the insulating tape 22. Since this perforation 26 has only a small dimension the first circuit of the motor 86 would be interrupted at the end portion 110 of the mobile contact 120 after the tape 22 has moved a short distance in the direction of the arrow A. However, the drum 138 and the extension 136 thereof has been rotated through a certain angle during this time so that the cam 102 permits the spring contact 98 to close and in consequence thereof the first circuit of the motor 86 is kept closed until the moment when the drum 138 and the extension 136 have completed a full revolution at which moment the spring contact 98 is once more interrupted by the cam 102 and the motor 86 and the drum 128 driven by the same are stopped. Then the next letter or phonetic symbol represented by perforations of the tape 22 is reproduced as sound, the cycle of operations repeating itself except that instead of the end portion extending through the perforation 14*a* some other end portion extending through the perforation 14*b* is rendered operative, and so on.

Referring now to Figs. 3–5, the embodiment shown in Fig. 3 of the drawings is based on the same principles as that shown in Figs. 1–2. However, the tape 22' (Fig. 4) used in this embodiment is slightly different from the tape 22 used in the first embodiment, the difference residing mainly in that the sets of perforations belonging to one sound are arranged so as to occupy a larger part of the length of the tape than in the Fig. 2. Furthermore, a plurality of probes 14', 14'' and 14''' etc. are provided which, however, could be combined in a single 42'. It will be noted that an analogue for mobile contact 56 being in permanent contact with the electroconductive face 12 of the plate 10 is missing in Fig. 3. However, a plurality of contacts such as 52', 52'' and 52''', each connected in series with a battery, such as 82', 82'' and 82''', is provided. The batteries 82', 82'', 82''', etc. are connected to contact pieces 200, 202, 204, etc., respectively, of a multiple switch 206 (see Fig. 5). Furthermore, the cam 102 of the embodiment shown in Fig. 1 is not provided in Fig. 3 and the other mobile contacts such as 120', 120'' etc. are multiplied. The multiple contact switch 206 comprises a shaft 210 connected by a conductor 260 to the terminal 84 of the electric motor 86. The shaft 130 of the electric motor is rigidly connected as in the embodiment shown in Fig. 1 to a gear wheel 132 meshing with the gear wheel 134 rigidly connected to the extension 136. However, the gear wheel 134 meshes with a gear wheel 212 formed at the outer perimeter of the multiple switch 206 in order to rotate the same.

The operation of this device is as follows:

As will be seen from Fig. 3 the probes 14', 14'', 14''' etc. have contacts thereof in simultaneous contact with the electroconductive face 12 of the plate 10. However, the multiple contact switch 206 prevents more than one lamp such as 108, 114, 118 to be energized at the same time. Actually, the multiple switch closes the connection from the shaft 210 thereof connected by the conductor 260 to one terminal of the light sources such as 108, 114, 118, etc. with the second contact pieces of the multiple switch 206 which are connected to the mobile contacts of the probes 14', 14'', 14''' through the batteries 82', 82'', 82''' etc. In consequence thereof the simultaneous contact made by the contacts of the probes 14', 14'', 14''' is resolved by the multiple switch 206 into a predetermined sequence depending on the number of secondary contact pieces thereof and performed in a time depending on the transmission ratio from the gear wheel 132 to the gear wheel 212 formed at the outer perimeter of the multiple switch 206.

It will be understood that each of the elements described above, or two or more together, may also find a useful application in other types of apparatuses differing from the types described above. For instance the arrangement according to the invention may be used in intercommunication and automatic telephone answering systems. In either of these systems the contacts that complete the circuit through the perforations in the tape can be actuated manually or automatically by pressing the desired contacts down to the conductive plate, or by raising the plate to make certain contacts.

While the invention has been illustrated and described as embodied in a reading apparatus to be used by blind persons, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What is claimed as new and desired to be secured by Letters Patent is:

1. A reading apparatus, comprising, in combination, a stationary plate having an electroconductive face; a stationary probe arranged opposite to said face of said plate at a predetermined distance from said face so as to define therewith a gap; means for moving an insulating tape in said gap, said insulating tape having a plurality of perforations; a plurality of movable contacts arranged in said probe, said contacts having, respectively, end portions adapted to make contact with said face of said plate through said perforations of said tape during the motion thereof; a first electric circuit including a current source, said face of said plate and part of said contacts of said probe; a second electric circuit including said face of said plate, said current source and another part of said contacts of said probe; an electric motor connected in said first electric circuit; a plurality of electric light sources inserted in said second electric circuit and associated, respectively, with said contacts forming said other part so as to be energized when said end portions thereof make contact with said face of said plate; a rotatable drum enclosing said light sources, said drum being permeable for light and having sound tracks associated, respectively, with said light sources; means inserted between said motor and said drum and driving said drum in correspondence with said motor so as to carry said sound tracks, respectively, around said light sources; photoelectric means arranged for cooperation with said sound tracks so as to be excited by the light beams emitted, respectively, by said light sources and traversing said sound tracks; and a sound-producing device connected to said photoelectric means, said device producing sounds corresponding, respectively, to said perforations of said tape when the latter is moved in said oblong gap defined by said plate and said probe.

2. A reading apparatus, comprising, in combination, a stationary plate having an electroconductive face; a stationary probe arranged opposite to said face of said plate at a predetermined distance from said face so as to define therewith a gap; means for moving an insulating tape in said gap, said insulating tape having a plurality of perforations; a plurality of movable contacts arranged in said probe, said contacts having, respectively, end portions adapted to make contact with said face of said plate through said perforations of said tape during the motion thereof; a first electric circuit including a current source, said face of said plate and part of said contacts of said probe; a second electric circuit including said face of said plate, said current source and another part of said contacts of said probe; an electric motor connected in said first electric circuit; a plurality of electric light sources inserted in said second electric circuit and associated, respectively, with said contacts forming said other part so as to be energized when said end portions thereof make contact with said face of said plate; a rotatable drum enclosing said light sources, said drum being permeable for light and having sound tracks associated, respectively, with said light sources; means inserted between said motor and said drum and driving said drum in correspondence with said motor so as to carry said sound tracks, respectively, around said light sources; contact means associated with said drum driving means, said contact means being connected in parallel to said contacts forming part of said first electric circuit, said contact means being open in one predetermined position of said drum driving means and closed when said drum driving means has positions substantially different from said predetermined position; photoelectric means arranged for cooperation with said sound tracks so as to be excited by the light beams emitted, respectively, by said light sources and traversing said sound tracks; and a sound-producing device connected to said photoelectric means, said device producing sounds corresponding, respectively, to said perforations of said tape when the latter is moved in said oblong gap defined by said plate and said probe.

3. A reading apparatus, comprising, in combination, a stationary plate having an electroconductive face; a stationary oblong probe arranged opposite to said face of said plate at a predetermined distance from said face so as to define therewith a gap; means for moving an insulating tape in said gap, said insulating tape having a plurality of perforations; a plurality of movable contacts arranged in said probe, said contacts having, respectively, end portions adapted to make contact with said face of said plate through said perforations of said tape during the motion thereof; a first electric circuit including a current source, said face of said plate and part of said contacts of said probe; a second electric circuit including said face of said plate, said current source and another part of said contacts of said probe; an electric motor connected in said first electric circuit so as to be energized when said end portions of said contacts forming part of said first electric circuit make contact with said face of said plate; a shaft forming part of said electric motor and being rotated by the same; a first gear wheel rigidly connected to said shaft so as to participate in the rotation thereof; a plurality of electric light sources inserted in said second electric circuit and associated, respectively, with said contacts forming said other part so as to be energized when said end portions thereof make contact with said face of said plate; a rotatable drum enclosing said light sources, said drum being permeable for light and having sound tracks associated, respectively, with said light sources; an extension rigidly connected to one of the end faces of said rotatable drum; a second gear wheel rigidly connected to said extension and being in engagement with said first gear wheel so that said drum is driven by said electric motor and said sound tracks are carried, respectively, around said light sources; a spring contact connected in parallel to said contacts forming part of said first electric circuit; means rigidly attached to said extension and opening said spring contact in a predetermined position thereof so that said electric motor is kept rotating by said spring contact when said end portions of said contacts forming part of said first electric circuit are partly kept out of contact with said face of said plate by said insulating tape, said electric motor being stopped when said spring contact is opened in said predetermined position thereof by said means rigidly attached to said extension; photoelectric means arranged for cooperation with said sound tracks so as to be excited by the light beams emitted, respectively, by said light sources and traversing said sound tracks; and a sound-producing device connected to said photoelectric means, said device producing sounds corresponding respectively, to said perforations of said tape when the latter is moved in said oblong gap defined by said plate and said probe.

4. A reading apparatus, comprising, in combination, a stationary plate having an electroconductive face; a stationary oblong probe arranged opposite to said face of said plate at a predetermined distance from said face so as to define therewith a gap; means for moving an insulating tape in said gap, said insulating tape having a plurality of perforations; a plurality of movable contacts arranged in said probe, said contacts having, respectively, end portions adapted to make contact with said face of said plate through said perforations of said tape during the motion thereof; a first electric circuit including a current source, said face of said plate and part of said contacts of said probe; a second electric circuit including said face of said plate, said current source and another part of said contacts of said probe; an electric motor connected in said first electric circuit so as to be energized when said end portions of said contacts forming part of said first electric circuit make contact with said face of said plate; a shaft forming part of said electric motor and being rotated by the same; a first gear wheel rigidly connected to said shaft so as to participate in the rotation thereof; a plurality of electric light sources inserted in said second electric circuit and associated, respectively, with said contacts forming said other part so as to be energized when said end portions thereof make contact with said face of said plate; a rotatable drum enclosing said light sources, said drum being permeable for light and having sound tracks associated, respectively, with said light sources; an extension rigidly connected to one of the end faces of said rotatable drum; a second gear wheel rigidly connected to said extension and being in engagement with said first gear wheel so that said drum is driven by said electric motor and said sound tracks are carried, respectively, around said light sources; a spring contact connected in parallel to said contacts forming part of said first electric circuit; means rigidly attached to said extension and opening said spring contact in a predetermined position thereof so that said electric motor is kept rotating by said spring contact when said end portions of said contacts forming part of said first electric circuit are partly kept out of contact with said face of said plate by said insulating tape, said electric motor being stopped when said spring contact is opened in said predetermined position thereof by said means rigidly attached to said extension; a photoelectric cell arranged for cooperation with said sound tracks so as to be excited by the light beams emitted, respectively, by said light sources and traversing said sound tracks; and a sound-producing device connected to said photoelectric cell, said device producing sounds corresponding, respectively, to said perforations of said tape when the latter is moved in said oblong gap defined by said plate and said probe.

5. A reading apparatus, comprising, in combination, a stationary plate having an electroconductive face; a stationary oblong probe arranged opposite to said face of said plate at a predetermined distance from said face so as to define therewith a gap; means for moving an insulating tape in said gap, said insulating tape having a plurality of perforations; a plurality of movable contacts arranged in said probe, said contacts having, respectively, end portions adapted to make contact with said face of said plate through said perforations of said tape during the motion thereof; a first electric circuit including a current source, said face of said plate and part of said contacts of said probe; a second electric circuit including said face of said plate, said current source and another part of said contacts of said probe; an electric motor connected in said first electric circuit so as to be energized when said end portions of said contacts forming part of said first electric circuit make contact with said face of said plate; a shaft forming part of said electric motor and being rotated by the same; a first gear wheel rigidly connected to said shaft so as to participate in the rotation thereof; a plurality of electric light sources inserted in said second electric circuit and associated, respectively, with said contacts forming said other part so as to be energized when said end portions thereof make contact with said face of said plate; a rotatable drum enclosing said light sources, said drum being permeable for light and having sound tracks associated, respectively, with said light sources; an extension rigidly connected to one of the end faces of said rotatable drum; a second gear wheel rigidly connected to said extension and being in engagement with said first gear wheel so that said drum is driven by said electric motor and said sound tracks are carried, respectively, around said light sources; a spring contact connected in parallel to said contacts forming part of said first electric circuit; means rigidly attached to said extension and opening said spring contact in a predetermined position thereof so that said electric motor is kept rotating by said spring contact when said end portions of said contacts forming part of said first electric circuit are partly kept out of contact with said face of said plate by said insulating tape, said electric motor being stopped when said spring contact is opened in said predetermined position thereof by said means rigidly attached to said extension; a photoelectric cell arranged for cooperation with said sound tracks so as to be excited by the light beams emitted, respectively, by said light sources and traversing said sound tracks; tubes associated, respectively, with said electric light sources and directing the light emitted by the same toward said photoelectric cell; and a sound-producing device connected to said photoelectric cell, said device producing sounds corresponding, respectively, to said perforation of said tape when the latter is moved in said oblong gap defined by said plate and said probe.

6. A reading apparatus, comprising, in combination, a stationary plate having an electroconductive face; a plurality of stationary oblong probes arranged opposite to said face of said plate at a predetermined distance from said face so as to define therewith a gap; means for moving an insulating tape in said gap, said insulating tape having a plurality of perforations; a plurality of sets of movable contacts arranged, respectively, in said probes, said contacts having, respectively, end portions adapted to make contact with said face of said plate through said perforations of said tape during the motion thereof, each of said sets including a first contact, a second contact, and additional contacts, said second contacts being multipled with each other, said additional contacts including corresponding contacts multipled with one another; a plurality of current sources connected, respectively, to said first contacts; an electric motor having a first terminal and a second terminal, said second terminal being connected with said second contacts multipled with one another; a multiple switch having a first contact piece and a plurality of second contact pieces cooperating with said first contact piece, one at a time, said first contact piece of said multiple switch being connected to said first terminal of said electric motor, said second contact pieces of said multiple switch being connected, respectively, with said current sources; means for imparting to said first contact piece of said multiple switch a motion relative to said second contact pieces of said multiple switch, said motion imparting means being connected to said electric motor so as to impart a relative motion of said first contact piece and said second contact pieces of said multiple switch in dependence on the rotation of said electric motor; a plurality of electric light sources associated, respectively, with said additional contacts multipled with one another; a rotatable part enclosing said light sources and having sound tracks associated, respectively, with said light sources; means for rotating said part so as to carry said sound tracks, respectively, around said light sources; photoelectric means arranged for cooperation with said sound tracks so as to be excited by the light beams emitted, respectively, by said light sources and traversing said sound tracks; and a sound-producing device connected to said photoelectric means, whereby said light sources are energized in a sequence determined by said perforations of said tape and the motion of said multiple switch.

7. A reading apparatus, comprising, in combination, a stationary plate having an electroconductive face; a plurality of stationary oblong probes arranged opposite to said face of said plate at a predetermined distance from said face so as to define therewith a gap; means for moving an insulating tape in said gap, said insulating tape having a plurality of perforations; a plurality of sets of movable contacts arranged, respectively, in said probes, said contacts having, respectively, end portions adapted to make contact with said face of said plate through said perforations of said tape during the motion thereof, each of said sets including a first contact, a second contact, and additional contacts, said second contacts being multipled with each other, said additional contacts including corresponding contacts multipled with one another, a plurality of current sources connected, respectively, to said first contacts; an electric motor having a first terminal and a second terminal, said second terminal being connected with said second contacts multipled with one another; a multiple switch including an insulated body; a first contact piece forming part of said multiple switch and arranged movably with respect to said body; a plurality of second contact pieces arranged, respectively, in fixed positions with respect to said body, said second contact pieces cooperating with said first contact piece, one at a time, said first contact piece of said multiple switch being connected to said first terminal of said electric motor, said second contact pieces of said multiple switch being connected, respectively, with said current sources; means for imparting to said body of said multiple switch a motion relative to said first contact piece, said motion imparting means being connected to said electric motor so as to impart a relative motion of said first contact piece and said second contact pieces of said multiple switch in dependence on the rotation of said electric motor; a plurality of electric light sources associated, respectively, with said additional contacts multipled with one another; a rotatable part enclosing said light sources and having sound tracks associated, respectively, with said light sources; means for rotating said part so as to carry said sound tracks, respectively, around said light sources; photoelectric means arranged for cooperation with said sound tracks so as to be excited by the light beams emitted, respectively, by said light sources and traversing said sound tracks; and a sound-producing device connected to said photoelectric means, whereby said light sources are energized in a sequence determined by said perforations of said tape and the motion of said multiple switch.

8. A reading apparatus, comprising, in combination, a stationary plate having an electroconductive face; a plurality of stationary probes arranged opposite to said face of said plate at a predetermined distance from said face so as to define therewith a gap; means for moving an insulating tape in said gap, said insulating tape having a plurality of perforations; a plurality of sets of movable contacts arranged, respectively, in said probes, said contacts having, respectively, end portions adapted to make contact with said face of said plate through said perforations of said tape during the motion thereof, each of said sets including a first contact, a second contact, and additional contacts, said second contacts being multipled with each other, said additional contacts including corresponding contacts multipled with one another; a plurality of current sources connected, respectively, to said first contacts; an electric motor having a first terminal and a second terminal, said second terminal being connected with said second contacts multipled with one another; a multiple switch including an insulated disc-shaped body having a spiral groove extending from a point near the center of said disc-shaped body to a point near the periphery thereof; a first contact piece forming part of said multiple switch and arranged movably with respect to said body; a plurality of second contact pieces arranged, respectively, in fixed positions in said groove of said disc-shaped body, said second contact pieces cooperating with said first contact piece, one at a time, said first contact piece of said multiple switch being connected to said first terminal of said electric motor, said second contact pieces of said multiple switch being connected, respectively, with said current sources; means for imparting to said body of said multiple switch a motion relative to said first contact piece, said motion imparting means being connected to said electric motor so as to impart a relative motion of said first contact piece and said contact pieces of said multiple switch in dependence on the rotation of said electric motor; a plurality of electric light sources associated, respectively, with said additional contacts multipled with one another; a rotatable part enclosing said light sources and having sound tracks associated, respectively, with said light sources; means for rotating said part so as to carry said sound tracks, respectively, around said light sources; photoelectric means arranged for cooperation with said sound tracks so as to be excited by the light beams emitted, respectively, by said light sources and traversing said sound tracks; and a sound-producing device connected to said photoelectric means, whereby said light sources are energized in a sequence determined by said perforations of said tape and the motion of said multiple switch.

9. A reading apparatus, comprising, in combination, a stationary plate having an electroconductive face; a plurality of stationary oblong probes arranged opposite to said face of said plate at a predetermined distance from said face so as to define therewith an oblong gap; means for moving an insulating tape in said oblong gap, said insulating tape having a plurality of perforations; a plurality of sets of movable contacts arranged, respectively, in said probes, said contacts having, respectively, end portions adapted to make contact with said face of said plate through said perforations of said tape during the motion thereof, each of said sets including a first contact, a second contact, and additional contacts, said second contacts being multipled with each other, said additional contacts including corresponding contacts multipled with one another; a plurality of current sources connected respectively to said first contacts; an electric motor having a first terminal and a second terminal, said second terminal being connected with said second contacts multipled with one another; a multiple switch including a switch shaft; an electroconductive rod arranged on said switch shaft so as to rotate therewith, said electroconductive rod being radially displaceable with respect to said switch shaft; a first contact piece movably attached to one end of said electroconductive rod, said first contact piece being connected to said first terminal of said electric motor; second contact pieces arranged about the circumference of said multiple switch; means for imparting to said body of said multiple switch a motion relative to said switch shaft, said motion imparting means being connected to said electric motor so as to impart a relative motion of said first contact piece and said second contact pieces of said multiple switch in dependence on the rotation of said electric motor; a plurality of electric light sources associated, respectively, with said additional contacts multipled with one another; a rotatable part enclosing said light sources and having sound tracks associated, respectively, with said light sources; means for rotating said part so as to carry said sound tracks, respectively, round said light sources; photoelectric means arranged for cooperation with said sound tracks so as to be excited by the light beams emitted, respectively, by said light sources and traversing said sound tracks; and a sound-producing device connected to said photoelectric means, whereby said light sources are energized in a sequence determined by said perforations of said tape and the motion of said multiple switch.

10. In a telecommunication system, in combination, a stationary plate having an electroconductive face; a stationary probe arranged opposite to said face of said plate at a predetermined distance from said face so as to define therewith a gap; means for moving an insulating tape in said gap, said insulating tape having a plurality of perforations; a plurality of movable contacts arranged in said probe, said contacts having, respectively, end portions adapted to make contact with said face of said plate through said perforations of said tape, said plurality of movable contacts being adapted to selectively make contact with said plate; an electric circuit including a current source, said face of said plate and said contacts of said probe; a plurality of electric light sources inserted in said electric circuit and associated, respectively, with said contacts so as to be energized when said end portions thereof make contact with said face of said plate; a rotatable part enclosing said light sources and having sound tracks associated, respectively, with said light sources; means for rotating said part so as to carry said sound tracks, respectively, around said light sources; photoelectric means arranged for cooperation with said sound tracks so as to be excited by the light means emitted, respectively, by said light sources and traversing said sound tracks; and means responding to the output of said photoelectric means in accordance with the closing of said electric circuit including said current source, said face of said plate and said plurality of contacts adapted to selectively make contact with said plate.

(References on following page)

References Cited in the file of this patent

UNITED STATES PATENTS

| | | |
|---|---|---|
| 513,364 | Kahn | Jan. 23, 1894 |
| 1,819,820 | Kent | Aug. 18, 1931 |
| 1,929,141 | Gohara | Oct. 3, 1933 |
| 1,969,680 | Zoppa | Aug. 7, 1934 |
| 2,284,694 | Townsend | June 2, 1942 |
| 2,540,285 | Phillips | Feb. 6, 1951 |
| 2,655,564 | Holt-Seeland | Oct. 13, 1953 |